Oct. 4, 1960
L. M. SHELDON
2,955,276
WIRING DEVICE WITH SIMPLIFIED WIRE TERMINALS
Filed Nov. 21, 1958
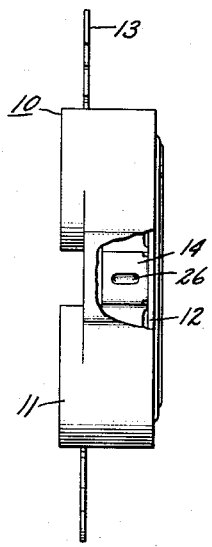
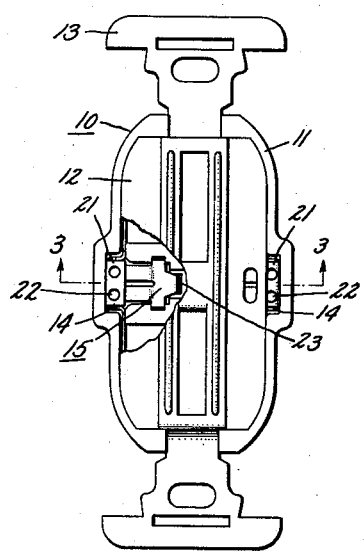
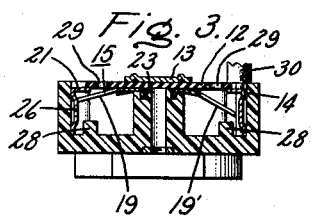
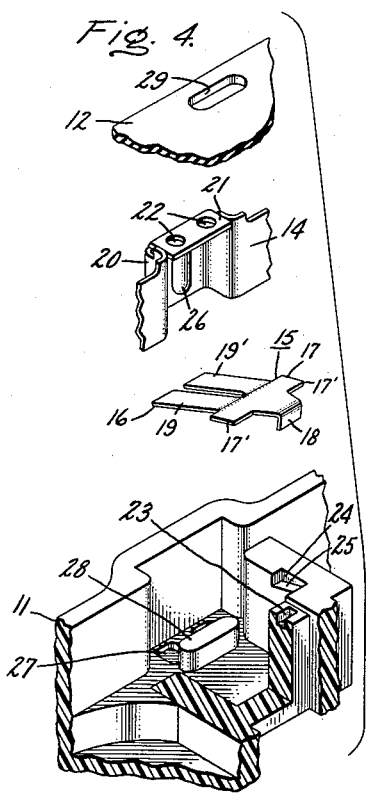
Inventor:
Luther M. Sheldon,
by Richard L. Caslin
His Attorney United States Patent Office 2,955,276
Patented Oct. 4, 1960

2,955,276

WIRING DEVICE WITH SIMPLIFIED WIRE TERMINALS

Luther M. Sheldon, Oaklawn, R.I., assignor to General Electric Company, a corporation of New York Filed Nov. 21, 1958, Ser. No. 775,580

3 Claims. (Cl. 339—95)

The present invention relates to electrical wiring devices and particularly to a simplified design of screwless wire terminals. For certain applications, this design is an improvement over the pioneer Benander Patent No. 2,705,785 which is assigned to the same assignee as is the present invention.

Screwless wire terminals of the spring locking type, as taught by the above Benander patent, have proven most successful for general application in the art of electrical wiring devices. However, cost can be taken out of the Benander design by reducing the size of the spring locking member and eliminating some of its intricate shape. Such a revamped design does not have the same general utility as the original Benander design but it does have certain applications which render it of value to the industry.

The principal object of the present invention is to provide an electrical wiring device with screwless wire terminals, using a spring locking member of simplified flat construction with special guiding features for preventing overstressing the material.

A further object of the present invention is to provide a method of supporting the screwless wire terminal of a wiring device where the locking member has spring characteristics with shifting axes of bending.

The preferred embodiment of the present invention has a spring locking member of generally flat construction with a blade section, an intermediate section and a hook portion at the opposite end. The back wall of the housing of the wiring device is open and the locking member is assembled through the back. The hook is received in a complementary indentation while guide projections on opposite sides of the intermediate section fit into recessed, inclined seats of the housing. A removable cover plate is fastened over the open back of the housing to complete the assembly of the device. Suitable openings are formed in the cover so that lead wires may be inserted into the housing. The blade section is almost parallel with the cover before the lead wires are inserted. Electrical contact members are positioned edgewise in the housing so that the bare ends of the lead wires will become wedged against a contact by the free end of the blade section of the locking members.

The cover clampingly engages the hook portion of each locking member, leaving the blade section and the intermediate section free to move. As a lead wire is being inserted in the housing, the blade section will bend aside about its hook end until the guide projections engage their inclined seats. Then all bending action takes place in the blade section. Release openings are also made in the cover so that a small tool such as a nail or miniature size screwdriver may be engaged with the blade section to press it inwardly of the housing and cause it to release its hold on the lead wire.

My invention will be better understood from the following description taken in connection with the accompanying drawing and its scope will be pointed out in the appended claims.

Figure 1 is a side view of a typical duplex convenience outlet embodying my invention with a portion of the side wall broken away to show the presence of one of the contact members.

Figure 2 is a bottom view or back view of the outlet of Figure 1 showing a portion of the back cover plate and mounting strap removed to gain an understanding of the method of supporting the spring locking member in the housing.

Figure 3 is a transverse cross-sectional view taken on the line 3—3 of Figure 2.

Figure 4 is a partial exploded view showing the details of the elements which comprise the screwless wire terminals and the adjacent parts cooperating therewith.

Referring in detail to the drawing and in particular to Figures 1 and 2, there is shown a duplex convenience outlet 10 with a housing comprising a recessed base member 11, a back cover plate 12 and a metal mounting strap 13. The front face (not shown) of the outlet contains two pairs of slots for receiving the parallel blades of attachment plugs. The back wall of the base is open so that a pair of electrical contact strips 14 may be positioned therein. As is standard practice, these contact strips have spring portions (not shown) for wiping engagement with the blades of the attachment plugs that are inserted into the outlet. The recessed base 11 is molded of insulating material while the back cover plate 12 is stamped from sheet insulating material as is common practice in this art. The metal mounting strap 13 extends around the back of the outlet for holding the cover to the base in the manner as shown in the Benander Patent No. 2,695,392.

The above details are mentioned as background information to afford a better understanding of the nature of the present invention. It is necessary to connect at least one lead wire to each contact strip 14. One method would be to use screw terminals that are threaded into the contacts. The use of screw terminals is time-consuming and difficult to manipulate—especially for the larger size wires. In recent years quick connect screwless wire terminals have gained wide acceptance. Turning to Figure 4, I have adopted a spring locking member 15 of generally flat metal construction with a blade section 16, an intermediate section 17 and a hook portion 18 at the end. Actually, the blade section is shown with dual blades 19 and 19', although it should be recognized that the invention remains the same whether a single blade is used or a double blade. The intermediate section 17 has a pair of guide projections or wings 17' which extend outwardly from the opposite sides of the locking member. Finally, the hook portion 18 is in the form of a small tab that extends at substantially a right angle to the plane of the intermediate section 17. The blade section 16 is slightly inclined with respect to the remainder of the locking member, as is best shown in Figure 4. Looking at Figure 3, the blade section is nearly parallel with the cover plate 12 before the lead wires 30 are inserted into the device.

As best shown in Figure 4, each contact strip 14 has a mid-section or terminal section 20 of generally channel shape for cooperation with a pair of lead wires. One edge of the contact strip has a folded guide plate 21 that incorporates a pair of wire-receiving openings 22. As is clearly illustrated in Figures 2 and 3, the cover plate 12 is recessed slightly into the back of the base 11. The cover engages the edges of the contact strips and holds them firmly in place. The guide plates 21 are left exposed by the cover so that the openings 22 are readily accessible for receiving the lead wires.

When the locking membr 15 is placed in the base, the hook end 18 drops into an indentation 23 while the two guide projections 17 are disposed within mating recesses 24 that have inclined seats 25. When the cover 12 is fastened to the base by the mounting strap 13, the hook end 18 of the locking member will be clamped and held down by the cover. This raises the projections 17' off the inclined seats 25, as is best seen at the left side of Figure 3. Notice in Figure 4 that the channel shaped mid-section 20 of the contact 14 has a vertical embossment 26 centered with respect to the openings 22, thereby tending to brace the bare ends of the lead wires against sidewise movement. Moreover, the rear surface of the front wall of the base contains a pair of depressions 27 (Figure 4) for receiving the free ends of the bare lead wires to hold the wires against forces tending to move them sidewise.

As a wire 30 is inserted through one of the openings 22 in the guide plate of the contact strip 14 the blade section 16 will be deflected to the side until the free end of one of the blades 19 or 19' engages the side surface of the conductor. Preferably, the wire will be inserted into the outlet until the leading end of the conductor is seated within one of the depressions 27 of the base. As the blade section 16 is deflected sidewise, the locking member will bend about its hook end 18 and the intermediate section 17 will shift until the guide projections engage the inclined seats 25. Then the bending takes place along a different axis, namely, where the blades 19 and 19' are attached to the intermediate section 17. This shifting of the axis about which the locking member bends, tends to relieve the effect of excessive stresses put in the material which might otherwise place a permanent set in the spring metal and destroy its usefulness. Furthermore, stop means 28, in the form of a molded projection, will only allow the free end of the blade section 16 to pivot through a predetermined angle.

Looking at both Figures 2 and 4, it will be seen that each side of the cover 12 is provided with a small opening 29 that overlies the blade section 16. This opening is an access opening so that a small tool such as the blade of a miniature screwdriver or a small nail may be inserted to engage one of the blades 19 or 19' and force the blades away from the conductor so that the conductor may be removed from the outlet. Oftentimes, the electrician might be in a hurry and an excessive force might be exerted to release the wire. The stop member 28 and the bending characteristics of the locking member 15 limits the damage that can be done by applying an excessive force to the blade section 16.

Having described above my novel invention of a simplified locking member for a quick connect screwless termination for electrical wiring devices, it will be readily apparent to those skilled in this art that I have designed against the possibility that excessive stresses may be set up in the locking member that might produce a permanent set in the material. I have likewise designed a locking member with a simple configuration that can be manufactured by a mass production method with uniform reliability and close tolerances without the use of expensive die methods and equipment.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A wiring device comprising a housing, at least one contact member positioned in the housing, and means for wedging a bare lead wire against the contact, said means comprising a locking member of generally flat construction having a blade section at one end, an intermediate section, and a hook portion at the opposite end, the housing having a pair of inclined recessed seats for cooperation with a pair of guide projections on the opposite sides of the blades to limit the movement of the blade section during insertion of the wire, the hook extending into a mating indentation of the housing, and cover means fastened to the housing to clamp the hook in its indentation, and lead wire-receiving openings in the cover adjacent the contact so that the tip of the blade section may wedge a lead wire against the contact.

2. A wiring device as recited in claim 1 wherein the blade section is almost parallel with the cover before the lead wires are inserted into the device, the blade section bending as a wire is inserted into the housing until the projections engage the inclined seats of the housing, these inclined seats serving as fulcrum means to distribute the bending stresses in the locking member as the lead wire is being inserted into the housing or removed from the housing.

3. A wiring device having a quick connect wire termination comprising a spring locking member of generally flat construction, said member having a blade section at one end an intermediate section, and a hook portion at the opposite end, the wiring device having a hollow housing with an indentation for receiving the hook end of the locking member, the intermediate section having an outwardly extending wing on each side that is received within a mating recess, the recess having an inclined seat which allows the member to bend about an axis at the hook end until the wings engage the seats, during insertion of the wire, further bending of the member taking place on an axis where the blade section merges with the intermediate section, and clamping means for holding the hook end in its indentation.

References Cited in the file of this patent

UNITED STATES PATENTS

| | | |
|---|---|---|
| 2,519,121 | Del Camp | Aug. 15, 1950 |
| 2,617,844 | Sanda | Nov. 11, 1952 |
| 2,695,392 | Benander | Nov. 23, 1954 |
| 2,705,785 | Benander | Apr. 5, 1955 |
| 2,841,673 | Benander | July 1, 1958 |